US011707087B2

(12) United States Patent
Schennum et al.

(10) Patent No.: US 11,707,087 B2
(45) Date of Patent: Jul. 25, 2023

(54) RE-CHARGING PACK FOR AN E-CIGARETTE

(71) Applicant: NICOVENTURES TRADING LIMITED, London (GB)

(72) Inventors: Steven Michael Schennum, London (GB); Thomas Michael McKeon, London (GB); Matthew Joel Nettenstrom, London (GB); Justin Banker Peart, London (GB)

(73) Assignee: Nicoventures Trading Limited, London (GB)

( * ) Notice: Subject to any disclaimer, the term of this patent is extended or adjusted under 35 U.S.C. 154(b) by 0 days.

(21) Appl. No.: 16/947,150

(22) Filed: Jul. 21, 2020

(65) Prior Publication Data

US 2020/0350783 A1 Nov. 5, 2020

Related U.S. Application Data

(63) Continuation of application No. 16/263,362, filed on Jan. 31, 2019, now Pat. No. 10,770,913, which is a (Continued)

(30) Foreign Application Priority Data

Jul. 24, 2014 (GB) ..................................... 1413124

(51) Int. Cl.
*A24F 9/16* (2006.01)
*H02J 7/00* (2006.01)
(Continued)

(52) U.S. Cl.
CPC ................ *A24F 9/16* (2013.01); *A24F 40/65* (2020.01); *A24F 40/90* (2020.01); *A24F 40/95* (2020.01);
(Continued)

(58) Field of Classification Search
CPC . A24F 9/16; H02J 7/342; H02J 7/0044; H02J 50/10; H02J 7/00; B65D 25/10; B65D 43/163; H01M 10/44; H01M 2220/30
(Continued)

(56) References Cited

U.S. PATENT DOCUMENTS

| | | | |
|---|---|---|---|
| D53,386 | S | 5/1919 | Joseph |
| 2,522,952 | A | 9/1950 | Joseph et al. |

(Continued)

FOREIGN PATENT DOCUMENTS

| | | | |
|---|---|---|---|
| CA | 2859610 A1 | 6/2013 | |
| CA | 2862045 A1 | 7/2013 | |

(Continued)

OTHER PUBLICATIONS

Communication pursuant to Article 94(3) EPC for Application No. 18199904.6, dated Apr. 30, 2021, 8 pages.

(Continued)

*Primary Examiner* — Peter G Leigh
(74) *Attorney, Agent, or Firm* — Patterson Thuente, P.A.

(57) ABSTRACT

Various embodiments provide a pack for holding and re-charging an e-cigarette. The pack includes a pack battery; a body portion including a tube for receiving an e-cigarette; a re-charging mechanism for re-charging the e-cigarette received into the tube using the pack battery, wherein the e-cigarette can be re-charged in the tube without disassembly of the e-cigarette; and a dual activation mechanism comprising two separate triggers for causing the re-charging mechanism to begin re-charging the e-cigarette received into the tube using the pack battery. The re-charging begins only in response to the direct activation by a user of both of the separate triggers.

15 Claims, 6 Drawing Sheets

Related U.S. Application Data continuation of application No. 15/328,099, filed as application No. PCT/GB2015/052129 on Jul. 23, 2015, now Pat. No. 10,236,708.

(51) Int. Cl.

| | |
|---|---|
| ***H02J 7/34*** | (2006.01) |
| ***A24F 40/90*** | (2020.01) |
| ***A24F 40/65*** | (2020.01) |
| ***A24F 40/95*** | (2020.01) |
| ***B65D 25/10*** | (2006.01) |
| ***B65D 43/16*** | (2006.01) |
| ***H01M 10/44*** | (2006.01) |
| *H02J 50/10* | (2016.01) |
| *A24F 40/10* | (2020.01) |

(52) U.S. Cl.

CPC ........... *B65D 25/10* (2013.01); *B65D 43/163* (2013.01); *H01M 10/44* (2013.01); *H02J 7/0044* (2013.01); *H02J 7/342* (2020.01); *A24F 40/10* (2020.01); *H01M 2220/30* (2013.01); *H02J 7/00* (2013.01); *H02J 50/10* (2016.02)

(58) Field of Classification Search

USPC ........................................................ 131/328

See application file for complete search history.

(56) References Cited

U.S. PATENT DOCUMENTS 3,583,625 A * 6/1971 Gero ...................... B65D 5/721 206/264
3,655,325 A * 4/1972 Toppel .................. G11B 33/06 369/67
3,749,234 A * 7/1973 Gero ...................... B65D 5/722 206/266
3,886,953 A * 6/1975 Pope ...................... A24F 15/18 131/270
3,963,033 A * 6/1976 Pope ...................... A24F 47/00 131/270
4,214,658 A 7/1980 Crow
D279,508 S 7/1985 Bauer et al.
4,776,353 A * 10/1988 Lilja ...................... A24B 15/18 131/273
4,848,376 A * 7/1989 Lilja ...................... A61K 9/007 131/335
4,850,006 A * 7/1989 Sasaki .................. H02J 7/0091 455/571
4,907,606 A * 3/1990 Lilja ...................... A24B 15/42 131/194
4,947,874 A 8/1990 Brooks et al.
5,044,550 A 9/1991 Lamm
D322,687 S 12/1991 Tschudin
D346,878 S 5/1994 Gee et al.
5,530,225 A 6/1996 Hajaligol
5,558,429 A 9/1996 Cain
5,612,732 A 3/1997 Yuyama et al.
5,649,554 A 7/1997 Sprinkel et al.
D392,069 S 3/1998 Rowland
5,865,185 A 2/1999 Collins et al.
5,878,752 A 3/1999 Adams et al.
5,934,289 A * 8/1999 Watkins .................. A24F 40/53 131/328
D414,892 S 10/1999 Chen
5,967,310 A * 10/1999 Hill ........................ A24F 23/04 131/329
6,012,459 A 1/2000 Keefe
D436,725 S 1/2001 Rogers
D441,133 S 4/2001 Emery
D449,521 S 10/2001 Pinkus et al.
6,446,793 B1 9/2002 Layshock
6,530,495 B1 3/2003 Joseph
6,637,430 B1 * 10/2003 Voges ................. A61M 15/008 128/200.14
6,803,550 B2 10/2004 Sharpe et al.
7,293,565 B2 11/2007 Griffin et al.
D566,329 S 4/2008 Bagaric et al.
D566,890 S 4/2008 Bagaric et al.
7,409,955 B2 8/2008 Mauldin et al.
7,455,176 B2 11/2008 Focke et al.
D631,838 S 2/2011 Cheng
7,896,002 B2 * 3/2011 Watanabe ........... A61M 15/025 128/200.14
D650,738 S 12/2011 Leung
8,156,944 B2 4/2012 Han
8,314,591 B2 11/2012 Terry et al.
8,448,783 B2 5/2013 Vecchi
D690,461 S 9/2013 Chen
D693,055 S 11/2013 Manca et al.
D700,397 S 2/2014 Manca et al.
8,684,172 B2 * 4/2014 Yao ...................... B65D 81/264 206/204
8,689,804 B2 4/2014 Fernando et al.
8,781,307 B2 * 7/2014 Buzzetti ............... A61M 11/044 392/395
8,794,245 B1 8/2014 Scatterday
8,794,434 B2 8/2014 Scatterday et al.
D715,760 S 10/2014 Kim et al.
D716,267 S 10/2014 Kim et al.
D720,884 S 1/2015 Liu
D723,738 S 3/2015 Liu
8,975,764 B1 3/2015 Abehasera
8,978,663 B2 3/2015 Newton
D736,460 S 8/2015 McKeon et al.
D737,507 S 8/2015 Liu
9,302,825 B2 4/2016 Liu
9,499,332 B2 11/2016 Fernando et al.
9,603,388 B2 3/2017 Fernando et al.
10,130,119 B2 11/2018 Murison
10,218,193 B2 2/2019 Gratton
10,750,779 B2 8/2020 Schennum et al.
2002/0005207 A1 * 1/2002 Wrenn ................... A24C 5/606 131/194
2003/0063523 A1 * 4/2003 Mulaw ................. G04B 47/006 368/10
2006/0196518 A1 9/2006 Hon
2007/0074734 A1 * 4/2007 Braunshteyn ........... A24F 40/46 131/328
2008/0121244 A1 * 5/2008 Bryman .................... A24F 3/00 131/328
2009/0051326 A1 2/2009 Wang et al.
2009/0096430 A1 * 4/2009 Van Der Linde ..... H02J 7/0044 320/166
2009/0283103 A1 11/2009 Nielsen et al.
2010/0126505 A1 * 5/2010 Rinker .................... A24F 42/10 128/202.21
2010/0307518 A1 * 12/2010 Wang ...................... A24F 40/53 131/329
2010/0313901 A1 * 12/2010 Fernando ............. H02J 7/0042 131/330
2011/0162663 A1 * 7/2011 Bryman .................... A24F 3/00 131/226
2011/0180433 A1 * 7/2011 Rennecamp ............ A24F 15/18 206/268
2011/0203600 A1 8/2011 Bardelli et al.
2011/0226266 A1 * 9/2011 Tao ........................... A24F 3/00 131/185
2011/0265806 A1 * 11/2011 Alarcon ................ H02J 7/0047 131/273
2011/0277780 A1 11/2011 Terry et al.
2012/0160251 A1 * 6/2012 Hammel ................... A24F 1/28 131/191
2012/0211014 A1 8/2012 Bardelli
2012/0227753 A1 * 9/2012 Newton .................. A24F 40/95 131/347
2012/0255567 A1 10/2012 Rose et al.
2013/0037042 A1 * 2/2013 Hearn ................... A61M 15/06 131/329
2013/0098786 A1 4/2013 Collins

(56) References Cited

U.S. PATENT DOCUMENTS

2013/0298922 A1 11/2013 Xiang et al.
2013/0300350 A1 11/2013 Xiang
2013/0314055 A1* 11/2013 Van Der Linde ....... H02J 7/345 320/167
2013/0333711 A1 12/2013 Liu
2013/0340778 A1* 12/2013 Liu ......................... A24F 40/60 131/329
2013/0341218 A1* 12/2013 Liu .................... H03K 17/9622 206/242
2013/0342157 A1* 12/2013 Liu ......................... A24F 15/01 320/107
2014/0007892 A1 1/2014 Liu
2014/0014124 A1 1/2014 Glasberg et al.
2014/0014125 A1 1/2014 Fernando et al.
2014/0020697 A1* 1/2014 Liu ......................... H02J 50/40 131/329
2014/0053858 A1 2/2014 Liu
2014/0083443 A1* 3/2014 Liu ....................... H02J 7/0042 131/329
2014/0096782 A1 4/2014 Ampolini et al.
2014/0097103 A1* 4/2014 Cameron ................ A24F 40/95 206/38
2014/0107815 A1* 4/2014 LaMothe ................ A24F 40/65 700/90
2014/0123990 A1* 5/2014 Timmermans .......... A24F 40/60 131/328
2014/0196731 A1 7/2014 Scatterday
2014/0196736 A1* 7/2014 Fernando .............. B08B 9/0808 131/329
2014/0286002 A1 9/2014 Liu
2014/0348495 A1 11/2014 Greim
2015/0015186 A1 1/2015 Xiang
2015/0020831 A1 1/2015 Weigensberg et al.
2015/0020832 A1 1/2015 Greim et al.
2015/0059785 A1 3/2015 Liu
2015/0114410 A1 4/2015 Doster
2015/0128971 A1 5/2015 Verleur et al.
2015/0128975 A1 5/2015 Alarcon
2015/0173419 A1* 6/2015 Tu ........................... A24F 40/46 131/329
2015/0201676 A1 7/2015 Shin
2015/0245654 A1 9/2015 Memari et al.
2015/0245668 A1 9/2015 Memari et al.
2015/0296885 A1* 10/2015 Liu ...................... H05B 1/0244 131/328
2015/0333542 A1 11/2015 Alarcon et al.
2015/0333552 A1 11/2015 Alarcon
2015/0333561 A1 11/2015 Alarcon
2016/0226286 A1 8/2016 Xiang
2016/0250201 A1 9/2016 Rose et al.
2016/0278436 A1 9/2016 Verleur et al.
2016/0374390 A1 12/2016 Liu
2017/0027221 A1 2/2017 Liu
2017/0086502 A1 3/2017 Hearn et al.
2017/0114965 A1 4/2017 Maglica et al.
2017/0207499 A1 7/2017 Leadley
2017/0208865 A1 7/2017 Nettenstrom et al.
2017/0222468 A1 8/2017 Schennum et al.
2018/0199618 A1 7/2018 Fuisz et al.
2019/0157887 A1 5/2019 Gratton
2019/0190088 A1 6/2019 Leadley
2020/0127478 A1 4/2020 Gratton

FOREIGN PATENT DOCUMENTS

CN 201290340 Y 8/2009
CN 201299102 Y 9/2009
CN 201341434 Y 11/2009
CN 201384062 Y 1/2010
CN 201571500 U 9/2010
CN 101869356 A 10/2010
CN 201813848 U 5/2011
CN 201928066 U 8/2011
CN 202122096 U 1/2012
CN 202679020 U 1/2013
CN 102970885 A 3/2013
CN 203416029 U 1/2014
CN 203481880 U 3/2014
CN 203481882 U 3/2014
CN 203491727 U 3/2014
CN 203491758 U 3/2014
CN 203504217 U 3/2014
CN 203504250 U 3/2014
CN 203537022 U 4/2014
CN 203554013 U 4/2014
CN 103798960 A 5/2014
CN 203633510 U 6/2014
CN 203633514 U 6/2014
CN 203662028 U 6/2014
CN 203689071 U 7/2014
EP 2253233 A1 11/2010
EP 2157873 B1 7/2011
EP 2573900 A1 3/2013
EP 2668858 A1 12/2013
EP 3171720 A1 5/2017
GB 1046183 7/1988
GB 2068034 11/1997
GB 4000273 12/2006
GB 4006615 10/2008
GB 2514893 A 12/2014
KR 200448273 Y1 3/2010
KR 20110003475 U 4/2011
KZ 27104 B 6/2013
RU 103281 U1 4/2011
RU 2489948 C2 8/2013
WO WO-2006082571 A1 8/2006
WO WO-2011146315 A2 11/2011
WO WO-2011146330 A2 11/2011
WO WO-2013102612 A2 7/2013
WO WO-2014017794 A1 1/2014
WO WO-2014066730 A1 5/2014
WO WO-2015150759 A1 10/2015
WO WO-2016012795 A1 1/2016

OTHER PUBLICATIONS

Decision to Grant dated May 15, 2019 for Russian Application No. 2018117145/12, 11 pages.
Decision to Grant dated Dec. 21, 2017 for Russian Application No. 2016138630, 9 pages.
Decision to Grant dated Mar. 20, 2018 for Russian Application No. 2017102047, 13 pages.
EP Search Report, Application No. GB1413127.7, dated Jan. 22, 2015, 5 pages.
Examination Report dated May 1, 2018 for Great Britain Application No. GB1413429.0, 4 pages.
Examination Report dated Sep. 27, 2017, for Great Britain Application No. GB1413429.0, 3 pages.
Extended Search Report for European Application No. 18199904.6, dated Mar. 13, 2019, 10 pages.
International Preliminary Report on Patentability for International Application No. PCT/GB2015/050956, dated Jul. 8, 2016, 18 pages.
International Preliminary Report on Patentability for Application No. PCT/GB2015/052129, dated Jan. 24, 2017, 7 pages.
International Search Report and Written Opinion for Application No. PCT/GB2015/052129, dated Sep. 7, 2015, 10 pages.
International Search Report for corresponding International Application No. PCT/GB2015/050956, dated Jul. 24, 2015, 5 pages.
International Search Report for corresponding International Application No. PCT/GB2015/050957, dated Jul. 24, 2015, 6 pages.
Notice of Opposition dated Aug. 1, 2019 for European Application No. 15744297.1, 100 pages.
Notification of International Preliminary Report on Patentability for Application No. PCT/GB2015/050957, dated Oct. 13, 2016, 9 pages.
Office Action dated Sep. 3, 2014, for Russian Application No. 2013504605, 7 pages.
Office Action dated Aug. 28, 2018 for Chinese Application No. 201580040920.9, 5 pages (10 pages with translation).

(56) References Cited

OTHER PUBLICATIONS

Office Action dated May 3, 2018 for Chinese Application No. 201580018258.7, 8 pages (15 pages with translation).
Office Action dated Oct. 19, 2018 for Chinese Application No. 201580041176.4, 5 pages.
Office Action dated May 3, 2018 for Chinese Application No. 2015800170791, 15 pages.
Office Action dated Apr. 5, 2018 for U.S. Appl. No. 15/328,730, 25 pages.
Office Action dated Mar. 6, 2020 for European Application No. EP3171720, 16 pages.
Search Report dated May 3, 2018 for Chinese Application No. 2015800170791, 2 pages.
Search Report dated Apr. 24, 2018 for Chinese Application No. 2015800170791, 2 pages.
Search Report dated Aug. 29, 2014 for Great Britain Application No. GB1405719.4, 4 pages.
Search Report dated Jan. 30, 2018 for Russian Application No. 2017101966, with Translation 2 pages.
Search Report dated Sep. 23, 2014 for corresponding GB Application No. 1405721.0, 5 pages.
Written Opinion for corresponding International Application No. PCT/GB2015/050956, dated Jul. 24, 2015, 8 pages.
Written Opinion for corresponding International Application No. PCT/GB2015/050957, dated Jul. 24, 2015, 7 pages.
Office Action for Chinese Application No. 201910271285.5, dated Oct. 8, 2021, 10 Pages.
Application and File History for U.S. Appl. No. 15/301,105, filed Sep. 30, 2016, 473 pages, Inventors: Schennum et al.
Application and File History for U.S. Appl. No. 15/301,178, filed Sep. 30, 2016, Inventors: Schennum et al., 455 pages.
Application and File History for U.S. Appl. No. 15/328,099, filed Jan. 23, 2017, Inventors: Schennum et al., 447 pages.
Application and File History for U.S. Appl. No. 15/328,730, filed Jan. 24, 2017, Inventors: Nettenstrom et al., 463 pages.
Application and File History for U.S. Appl. No. 29/503,949, filed Sep. 30, 2014, Inventor: Schennum, 314 pages.
Application and File History for U.S. Appl. No. 16/263,362, filed Jan. 31, 2019, Inventors: Schennum et al., 303 pages.
Examination Report under Section 18(3) for Great Britain Application No. 1413124.7, dated Jul. 30, 2020, 7 pages.
Office Action for Chinese Application No. 201910271285.5, dated Mar. 30, 2021, 12 pages.
Reply to Appeal for European Patent No. 3171720, dated Nov. 29, 2021, 47 pages.
Summons to Attend Oral Proceedings Pursuant to Rule 115(1) EPC for European Application No. 18199904.6, dated Mar. 4, 2022, 8 pages.

* cited by examiner

RE-CHARGING PACK FOR AN E-CIGARETTE

CROSS-REFERENCE TO RELATED APPLICATIONS

This application is a continuation of application Ser. No. 16/263,362, filed Jan. 31, 2019, which is a continuation of application Ser. No. 15/328,099 filed Jan. 23, 2017, which in turn claims priority from National Phase entry of PCT Application No. PCT/GB2015/052129, filed Jul. 23, 2015, which claims priority from GB Patent Application No. 1413124.7, filed Jul. 24, 2014, each of which is hereby fully incorporated herein by reference.

TECHNICAL FIELD

The present application relates to a re-charging pack for an e-cigarette, such as an electronic vapor provision system or an electronic nicotine delivery system.

BACKGROUND

Electronic vapor provision systems, electronic nicotine delivery systems, etc., which are collectively referred to herein as e-cigarettes, generally contain a reservoir of liquid which is to be vaporized. When a user sucks or draws on the device, this activates a heater to vaporize a small amount of liquid, which is then inhaled by the user. Most e-cigarettes include a re-chargeable battery for supplying electrical power to the heater and other electrical/electronic components, such as a sensor to detect inhalation. Some e-cigarettes have a cartridge section. After the nicotine or other liquid in this cartridge has been exhausted, the empty cartridge can be removed or separated from the e-cigarette and replaced with a new cartridge containing further nicotine.

E-cigarettes are often supplied in packs for protection and easy portability. Such packs may accommodate multiple e-cigarettes and/or replacement cartridges, thereby offering a backup facility if one e-cigarette (or its cartridge) is exhausted. An e-cigarette pack may also have the ability to re-charge an e-cigarette, again helping to ensure good operating availability of the e-cigarette for a user. Typically a pack is provided with a cylindrical hole for receiving an e-cigarette for recharging, the hole generally reflecting the elongated, cylindrical shape of an e-cigarette. When the e-cigarette is located in the hole, the battery can be re-charged by a suitable wired or wireless connection (a wireless connection may rely upon induction charging). In some packs, the cylindrical hole may receive the entire e-cigarette for re-charging, while in other packs only a portion of the e-cigarette may be received into the hole.

In some devices, the pack must be connected to a power supply, e.g. a mains outlet or USB connection, during re-charging of the e-cigarette battery. In this case, the pack is typically acting as a convenient device for holding and interfacing to the e-cigarette during re-charging. In other devices, the pack itself is provided with a battery (or other charge storage facility). The pack battery allows the e-cigarette to be re-charged from the pack without the need for the pack to be connected to an external power supply during the re-charging, thereby providing greater convenience for a user.

The pack battery will of course be depleted in due course, and so is generally provided with its own re-charging facility—typically again reliant upon some form of mains or USB connection. However, since the pack is larger than an e-cigarette, it can accommodate a larger battery and therefore the pack does not have to be re-charged as frequently as an e-cigarette. For example, the charge capacity of a typical e-cigarette battery may be approximately 60 mAh, whereas the charge capacity of a typical pack battery might be in the region of 800 mAh. Accordingly, the pack battery is capable of re-charging the e-cigarette a few times at least before the pack battery itself needs to be re-charged.

Such a multiple or hierarchical arrangement of separately chargeable systems, namely firstly an e-cigarette and secondly a pack for the e-cigarette, is relatively rare. In contrast, most re-chargeable devices, e.g. mobile (cell) phones, are usually connected directly to a mains-powered charging supply (or else to an in-car charging supply). It is desirable for the (re)charging of an e-cigarette and associated pack to be as reliable and convenient for a user as possible.

SUMMARY

Various embodiments provide a pack for holding and re-charging an e-cigarette. The pack comprises a pack battery; a body portion including a tube for receiving an e-cigarette; a re-charging mechanism for re-charging the e-cigarette received into said tube using the pack battery, wherein the e-cigarette can be re-charged in the tube without disassembly of the e-cigarette; and a dual activation mechanism comprising two separate triggers for causing the re-charging mechanism to begin re-charging the e-cigarette received into said tube using the pack battery. The re-charging begins only in response to the direct activation by a user of both of the separate triggers.

The present approach is not restricted to specific embodiments such as set out herein, but features from different embodiments may be combined, modified, omitted or replaced by the skilled person according to the circumstances of any given implementation.

BRIEF DESCRIPTION OF THE DRAWINGS

Various embodiments of the disclosure will now be described in detail by way of example only with reference to the following drawings:

FIG. 5 is a perspective view showing the annular light element as fitted into the insert;

FIG. 6 is an exploded view showing the annular light element and insert disassembled; and FIG. 7 is a cross-section in a vertical plane through the annular light element as fitted into the insert.

DETAILED DESCRIPTION

Figure 1:
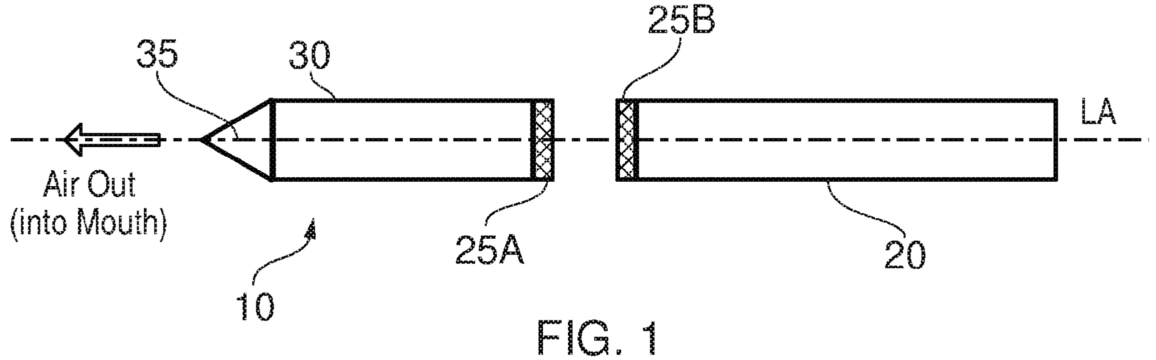
FIG. 1 is a schematic (exploded) diagram of an e-cigarette in accordance with some embodiments of the disclosure.

FIG. 1 is a schematic diagram of an e-cigarette 10 in accordance with some embodiments of the invention (not to scale). The e-cigarette has a generally cylindrical shape, extending along a longitudinal axis indicated by dashed line LA, and comprises two main components, namely a body 20 and a cartomizer 30. The cartomizer includes an internal chamber containing a reservoir of nicotine, a vaporizer (such as a heater), and a mouthpiece 35. The reservoir may be a foam matrix or any other structure for retaining the nicotine until such time that it is required to be delivered to the vaporizer. The cartomizer 30 also includes a heater for vaporizing the nicotine and may further include a wick or similar facility to transport a small amount of nicotine from the reservoir to a heating location on or adjacent the heater.

The body 20 includes a re-chargeable cell or battery to provide power to the e-cigarette 10 and a circuit board for generally controlling the e-cigarette. When the heater receives power from the battery, as controlled by the circuit board, the heater vaporizes the nicotine and this vapor is then inhaled by a user through the mouthpiece 35.

The body 20 and cartomizer 30 are detachable from one another by separating along the longitudinal axis LA, as shown in FIG. 1, but are joined together when the device 10 is in use by a connection, indicated schematically in FIG. 1 as 25A and 25B, to provide mechanical and electrical connectivity between the body 20 and the cartomizer 30. The electrical connector on the body 20 that is used to connect to the cartomizer may also serve as a socket for connecting to a charging device (not shown) when the body 20 is detached from the cartomizer 30.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette 10. This airflow (or the resulting change in pressure) is detected by a pressure sensor that in turn activates the heater to vaporize the nicotine from the cartridge. The airflow passes through, and combines with, the nicotine vapor, and this combination of airflow and nicotine vapor then passes out of the mouthpiece 35 to be inhaled by a user. The cartomizer 30 may be detached from the body 20 and disposed of when the supply of nicotine is exhausted (and replaced with another cartomizer if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece (which can be replaced when the nicotine from the reservoir is exhausted), and a vaporizer comprising a heater (which is generally retained). In other embodiments, the e-cigarette 10, the body 20 and the cartomizer 30 may be joined together permanently, so in effect they are just a single component. Some such unitary (one-piece) e-cigarettes may allow replenishing of a nicotine reservoir when exhausted using some suitable (re)supply mechanism; other one-piece e-cigarettes may be disposed of once the nicotine reservoir has been exhausted. Note that this latter type of device still generally supports re-charging because the battery will normally become depleted more quickly than the nicotine reservoir. The skilled person will be aware of many further possible designs and implementations of an e-cigarette.

Figure 2:
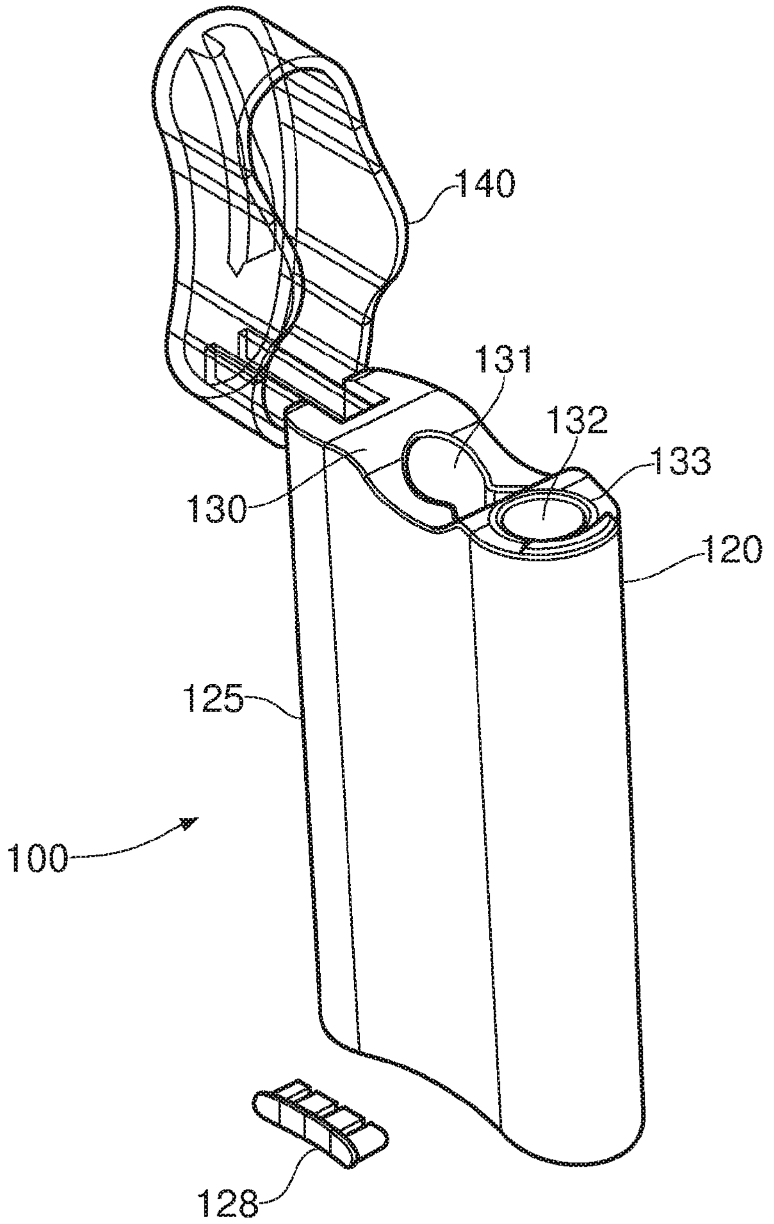
FIG. 2 illustrates a pack 100 for receiving and accommodating an e-cigarette in accordance with some embodiments of the disclosure.

FIG. 2 illustrates a pack 100 for receiving and accommodating an e-cigarette in accordance with some embodiments of the invention. The pack comprises a body 120 which is provided with a hinged lid 140 that can open and close. The body 120 comprises an outer case or housing 125 which is fitted with an insert 130. More particularly, the outer case 125 has an opening at the top, i.e. the end at which the lid 140 is located, and the insert 130 is fitted into, and generally closes, this opening. The insert 130 itself is provided with two openings or holes that extend down into the body 120 of the pack 100. The first opening 132 comprises a substantially circular hole (in terms of cross-sectional shape). The first opening 132 is surrounded by an annular light element 133, as described in more detail below. The second opening 131 in the insert 130 comprises a pair of linked holes (only one of which is easily visible in FIG. 2). The openings 132 and 131 (and more particularly, each of the pair of holes formed by opening 131) can be used to receive an appropriately shaped object, such as an e-cigarette, a spare or used cartridge, etc. The dimensions of pack 100 are generally arranged so that an e-cigarette accommodated within openings 132 or 131 protrudes slightly out of this opening. This allows a user to readily discern the contents of pack 100 (as also helped by making lid 140 transparent), and also facilitates removal by a user of an e-cigarette located within one of these openings.

The pack 100 is further provided with a set of LED lights, which are mounted on a PCB 160 (as described below in relation to FIG. 3). These LED lights are protected by light cover 128, which is shown separated from the casing 125 in FIG. 2 in an exploded view, but which in the assembled pack is integrated into the body 120 so as to lie flush with the outer casing 125. These LED lights can be used to indicate the charging state of the pack 100, for example, whether it is fully charged, partly charged, or fully discharged. The LEDs lights may also be used to indicate whether or not the pack 100 is currently charging (being charged). Such charging may be accomplished via a (mini or micro)USB link using a (mini or micro)USB connector located on the underside of the pack 100 (not visible in FIG. 2).

Figure 3:
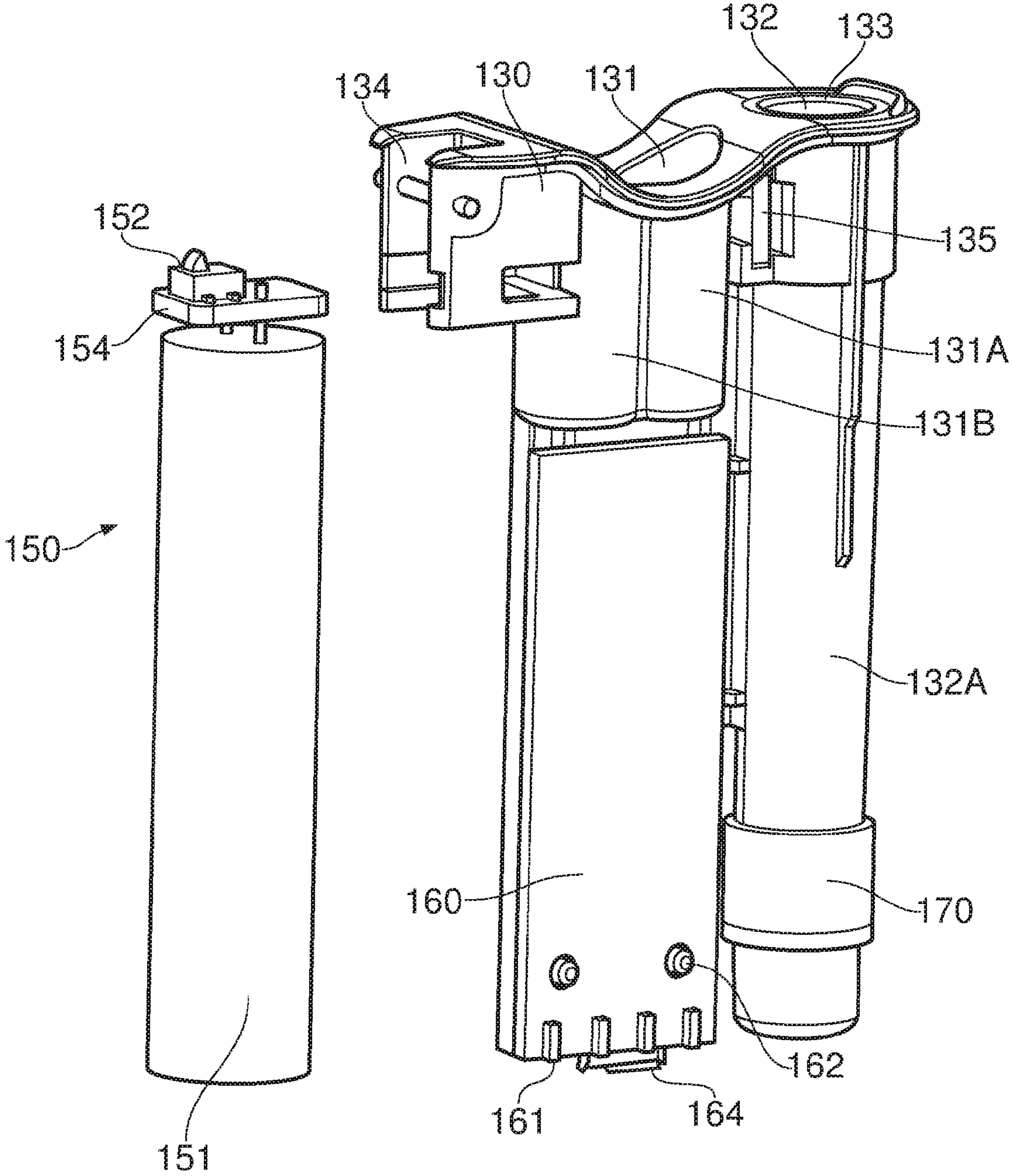
FIG. 3 illustrates the main internal components of the pack of FIG. 2 in accordance with some embodiments of the disclosure.

FIG. 3 illustrates the main components that are housed within the body 120 of the pack 100, more particularly, within housing 125, in accordance with some embodiments of the disclosure (some minor components, such as internal wiring, are omitted for reasons of clarity). The body includes a battery unit 150 comprising a battery 151, a printed circuit board (PCB) 154, and a switch 152. For clarity, the battery unit 150 is shown separated from the insert 130, however, in practice the two are assembled together. The body 120 can be seen to include a hinge or axle 134, which provides a pivot about which the lid 140 is able to open and shut. The battery unit 150, including the switch 152, is located substantially below the hinge 134.

As illustrated in FIG. 3, the insert 130 extends substantially to the bottom of the outer casing 125. The insert 130 defines a substantially cylindrical tube 132A extending down from opening 132, which is able to receive and hold an e-cigarette. The insert 130 further includes two further substantially cylindrical tubes 131A, 131B, which overlap one another, extending down from opening 131 with a "figure-of-8" cross-section. Note that the bottom of tubes 132A, 131A and 131B may be closed by the insert 130 itself, or may be open, but abutting against the bottom of the outer casing 125, which would then have the effect of again closing the bottom of the tubes 132A, 131A and 131B in order to retain an e-cigarette (or other item, such as a spare cartridge, therein).

Note that the battery 151 is relatively large—comparable in size, for example, with the opening 132 and associated tube 132A for receiving an e-cigarette. Consequently the battery 151 of the pack 100 will usually have significantly greater electrical storage capacity than a battery provided in an e-cigarette which may be accommodated within the pack. This allows the battery in the e-cigarette to be re-charged, typically several times, using the battery unit 150 of pack 100, without the need for any additional, external power supply (such as a mains connection). This can be very convenient for a user, who may be in a location or situation which does not provide a ready connection to the mains.

In order to support this re-charging of an e-cigarette stored within the pack 100, a portion of the tube 132A is provided with a coil 170 which is coaxial with the tube 132A and forms in effect a collar or sleeve around the tube 132A. This tube is used to perform induction charging of an e-cigarette located in the tube 132A. Alternatively, the tube 132A may be provided with a suitable electrical contact at its base (or elsewhere) to provide a wired power supply for an e-cigarette (or portion thereof) inserted into the tube 132A. For example, in some embodiments, the body portion 20 of e-cigarette 10 such as shown in FIG. 1 might be inserted into tube 132A for re-charging via connector 25B. In such an embodiment, tube 132A may be reduced in length so that some portion of the body 20 protrudes from the top of tube 132A, thereby facilitating easier removal of the body 20 from the tube. In this case, the tube 132A may or may not be able to accommodate a fully assembled e-cigarette (but this can be facilitated by providing increased space (depth) in lid 140).

In some embodiments, the e-cigarette 10 may be provided with a pair of electrical contacts on the end opposite from mouthpiece 35—i.e. the tip of the e-cigarette 10. For example, one electrical contact may be provided in the center of the tip, and the other electrical contact may be provided as a circular ring around the edge or rim of the tip. The base of the tube 132A may be provided with an electrical connector having a complementary pair of contacts. Accordingly, when the e-cigarette 10 is received (tip-first) into the tube 132A, the contacts on the tip of the e-cigarette 10 form a wired electrical connection with the complementary contacts at the base of the tube to permit re-charging of the e-cigarette battery. This configuration has the benefit that the e-cigarette 10 does not need any disassembly for insertion into the pack 100 for re-charging—e.g. there is no need to separate body 20 from cartomizer 30 to expose connector 25B. Consequently, the e-cigarette 10 remains available for immediate use (if suitably charged).

It is also convenient if the wired electrical connection can be formed without requiring a particular user manipulation—in contrast to (for example) a screw thread which requires rotational engagement, or some form of bayonet fitting. Rather, the wired electrical connection may be formed by using the force of gravity to pull the connector on the tip of the e-cigarette 10 down against connector on the base of tube 132A, thereby providing a very easy insertion (and removal) process for a user. In some embodiments, the connection between the connector on the tip of the e-cigarette 10 and the connector on the base of tube 132A may be augmented by the lid 140 applying downward pressure from the lid 140 onto the e-cigarette 10 when the lid 140 is closed, which can help to provide a more reliable electrical connection. (This downward pressure from the lid may be assisted by the over-centre biasing mechanism of the lid, as described in more detail below.)

Returning to FIG. 3, the insert 130 is provided with two printed circuit boards (PCBs), 135 and 160. The PCB 160 provides the main control functionality of the pack 100, as will be described in more detail below, and is attached to tubes 131A, 131B by pegs that extend outwards from the walls of tube 131A, 131B through corresponding holes 162 in the PCB 160, thereby retaining the PCB in the appropriate position relative to the tubes 131A, 131B. These pegs may be supplemented (or replaced) by any other appropriate fixing mechanism, such as one or more screws, a rib structure (for use in conjunction with the screws), and so on.

A mini-USB (or micro-USB) connector 164 is provided at the bottom of the PCB 160, and is accessible through a corresponding aperture in the underside of the housing 125 of the pack body 120. This USB connector 164 can be used to connect an external power supply to the pack 100 for re-charging the battery 151 (and also any e-cigarette located in hole 132A).

The USB connector 164 may also be used, if so desired, for communications with the electronics of the e-cigarette 10, for example to update software on the PCB 160 and/or to download usage data from the PCB 160, etc. The PCB 160 is further provided with the LED indicator lights discussed above, along with a set of mechanical connectors 161 for retaining the light cover 128. In particular, the PCB 160 controls the LED indicator lighting to provide an indication to a user about the current charging situation of the pack 100, plus any other suitable information.

The other PCB 135 associated with the insert 130 is located on the outside of re-charging tube 132A, relatively near the top, i.e. closer to the hole or opening 132 for receiving an e-cigarette for re-charging. This PCB 135 incorporates at least one light emitting diode (LED), which is used to illuminate the annular light element 133, as described in more detail below. Note that in some embodiments, PCB 135 may be supplemented by one or more additional PCBs, each with one or more additional LEDs. This can help to increase the illumination level of the annular light element 133.

It will be appreciated that the configuration and arrangement of the pack 100 and insert 130 shown in FIGS. 2 and 3 are provided by way of example, and the skilled person will be aware of many potential variations—e.g. the number, position, size and/or shape of holes 131, 132 may vary from one embodiment to another, likewise the associated tubes 131A, 131B, 132A. Similarly, the details of the positioning, shape and size of the battery unit 150, PCB 160, and other components will generally vary from one embodiment to another, depending upon the particular circumstances and requirements of any given implementation.

Figure 4:
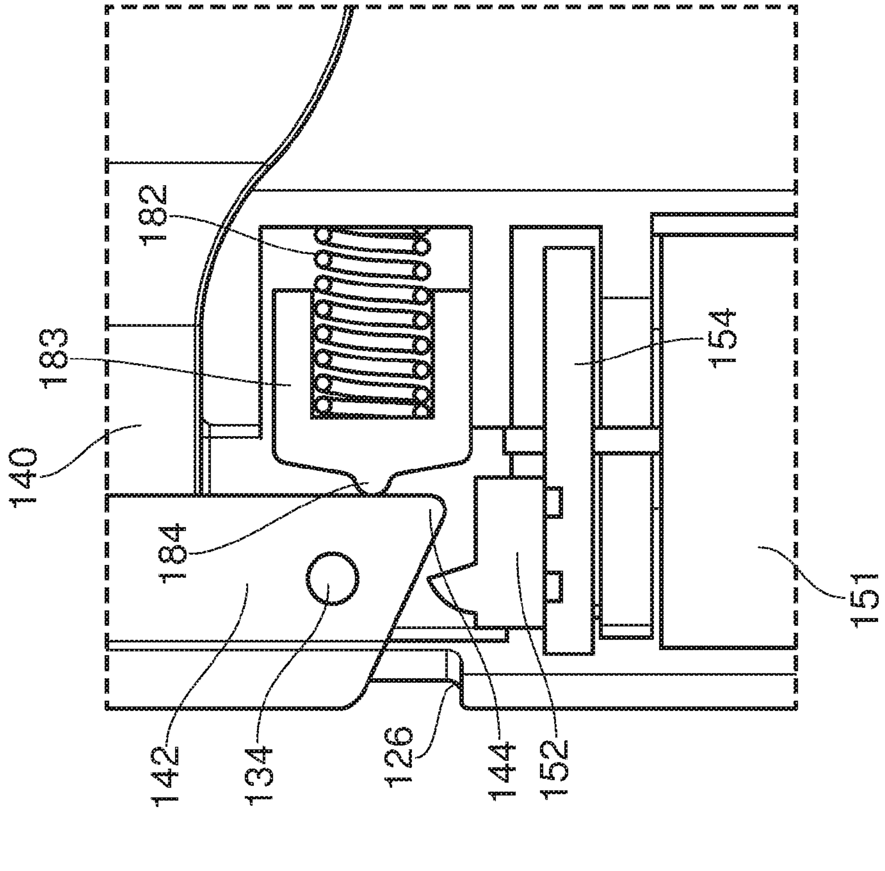
FIG. 4 illustrates a detail of the pack of FIG. 2, especially regarding the operation of the lid, in accordance with some embodiments of the disclosure.

FIG. 4 illustrates a detail of the pack 100 in terms of the operation of the action of the lid 140 as it rotates open and shut about hinge 134. In particular, FIG. 4 comprises a cross-section view through the pack 100 in a vertical plane in accordance with some embodiments of the invention. The insert 130 is provided with a biasing unit comprising a coil spring 182 and a cap 183, the end of which is emphasized by a protruding nipple 184. As the lid 140 is rotated open from the closed position shown in FIG. 4, the lid arm 142 pivots in counter-clockwise fashion about hinge (axle) 134. This rotation causes the arm 142 to push against the cap 183, thereby tending to compress spring 182, which therefore opposes this initial stage of the rotation of the lid 140. However, once the corner 144 of the arm 142 which is furthest from the hinge 134 has passed the nipple 184 on the cap, further rotation of the lid 140 in an opening direction allows the spring 182 to expand again. In other words, the spring 182 encourages this later stage of rotation (which continues until the arm 142 reaches a mechanical stop, provided by the top rim or ledge 126 of the outer casing 125). This two-stage effect of the spring 182 provides an over-center biasing mechanism with respect to the opening of the lid 140, in effect driving the lid 140 to one of two favored positions—either fully open or fully shut.

The rotational movement of the lid arm 142 between the open and shut positions also results in a mechanical engagement between the lid arm 142 and the switch 152 attached to the PCB. In particular, opening and closing of the lid 140 activate the switch 152 in opposite directions, thereby allowing the control system of the pack 100 to use the state of switch 152 to determine whether the lid 140 of the pack 100 is open or shut.

Figure 5:
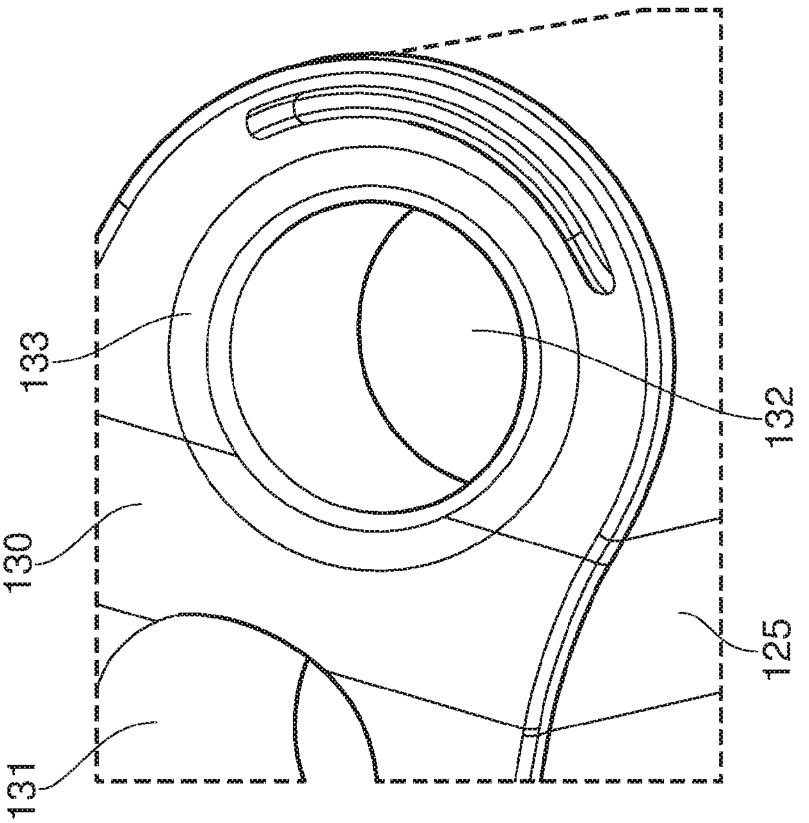
FIGS. 5, 6 and 7 illustrate in more detail the annular light element and the insert from the pack of FIG. 2 in accordance with some embodiments of the disclosure. In particular.
Figure 7:
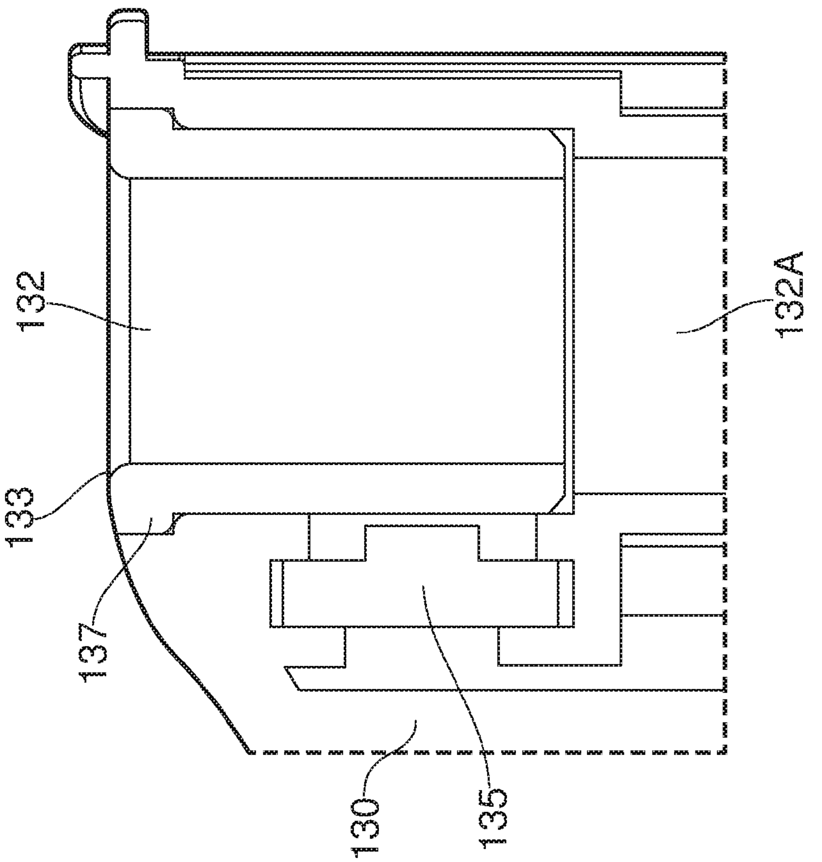
Figure 6:
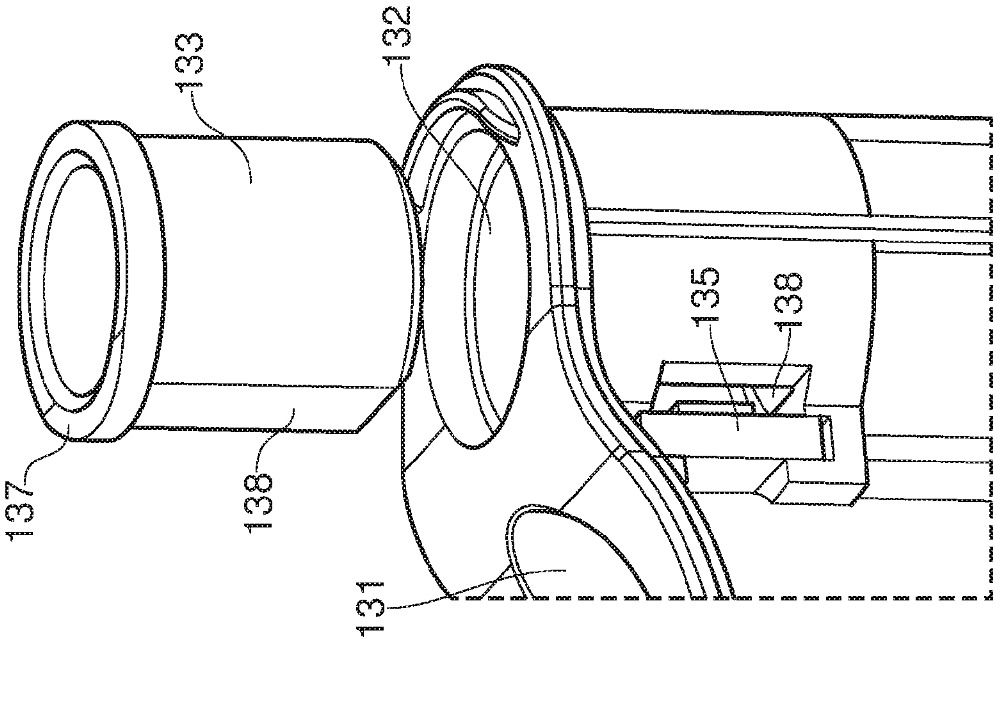

FIGS. 5, 6 and 7 illustrate in more detail the annular light element 133 and its relationship to the insert 130 in accordance with some embodiments of the disclosure. In particular, FIG. 5 is a perspective view showing the annular light element 133 as fitted into the insert 130 (and also outer case 125); FIG. 6 is an exploded view showing the annular light element 133 and insert 130 disassembled; and FIG. 7 is a cross-section in a vertical plane through the annular light element 133 as fitted into the insert 130.

The annular light element 133 is in the shape of a tube or sleeve. The inner surface of this tube comprises a cylinder of circular cross-section and is sized to receive an e-cigarette for storage and/or re-charging. The outer surface of the tube is likewise generally a cylinder of circular cross-section, but has two additional features. The first is a lip or rim 137 directed radially outwards at the top of the annular light element (assuming the normal orientation of pack 100, whereby the lid 140 is at the top, and an e-cigarette 10 would be inserted downwards through opening 132). This lip rests on a corresponding ledge formed at the top of tube 132A, adjacent opening 132, and the lip and ledge cooperate to maintain the annular light element at the correct position within the tube 132A—i.e. so that the annular light element does not disappear further down into the tube 132A. The lip also helps to provide a greater light emitting area, as described in more detail below.

The second additional feature is a flattened or planar surface 138, which in a horizontal plane forms a chord with respect to the otherwise circular outer cross-section of the annular light element. This flattened surface 138 helps to prevent rotation of the angular light element 133 within tube 132A in an azimuthal direction about the axis of tube 132A (which is coaxial with the axis of the annular light element, and also an inserted e-cigarette).

The flattened surface 138 is positioned facing and immediately adjacent to the PCB 135 which incorporates at least one light emitting diode (LED). As noted above, this LED is used to illuminate the annular light element 133. This transfer of light from the LED into the annular light element 133 is facilitated by the flattened surface 138 of the annular light element 133, since it allows a greater surface area of the annular light element 133 to be positioned close to the LED. The light transfer is also facilitated by a slot or aperture 138 which is cut into the wall of the tube 132A (see FIG. 6). In particular, the aperture 138 allows the LED provided by the PCB 135 to protrude into and through the wall of the tube 132A, and hence to lie immediately adjacent the annular light element 133.

The annular light element 133 is formed of a transparent or translucent material which allows light from the LED to spread through the material of the annular light element. This light is able to exit through the top of the annular light element 133, and hence is visible to a user. It will be appreciated that lip 137 helps to expose a greater surface area of the annular light element 133 for this emission of light, thereby increasing visibility to a user.

The annular light element 133 provides an indication to the user of the charging state of an e-cigarette inserted into the tube 132A. In particular, the PCB 135 is controlled to illuminate the LED according to various predetermined criteria relating to the charging state of the e-cigarette, thereby providing the user with direct visual information relating to this charging state.

Figure 8:
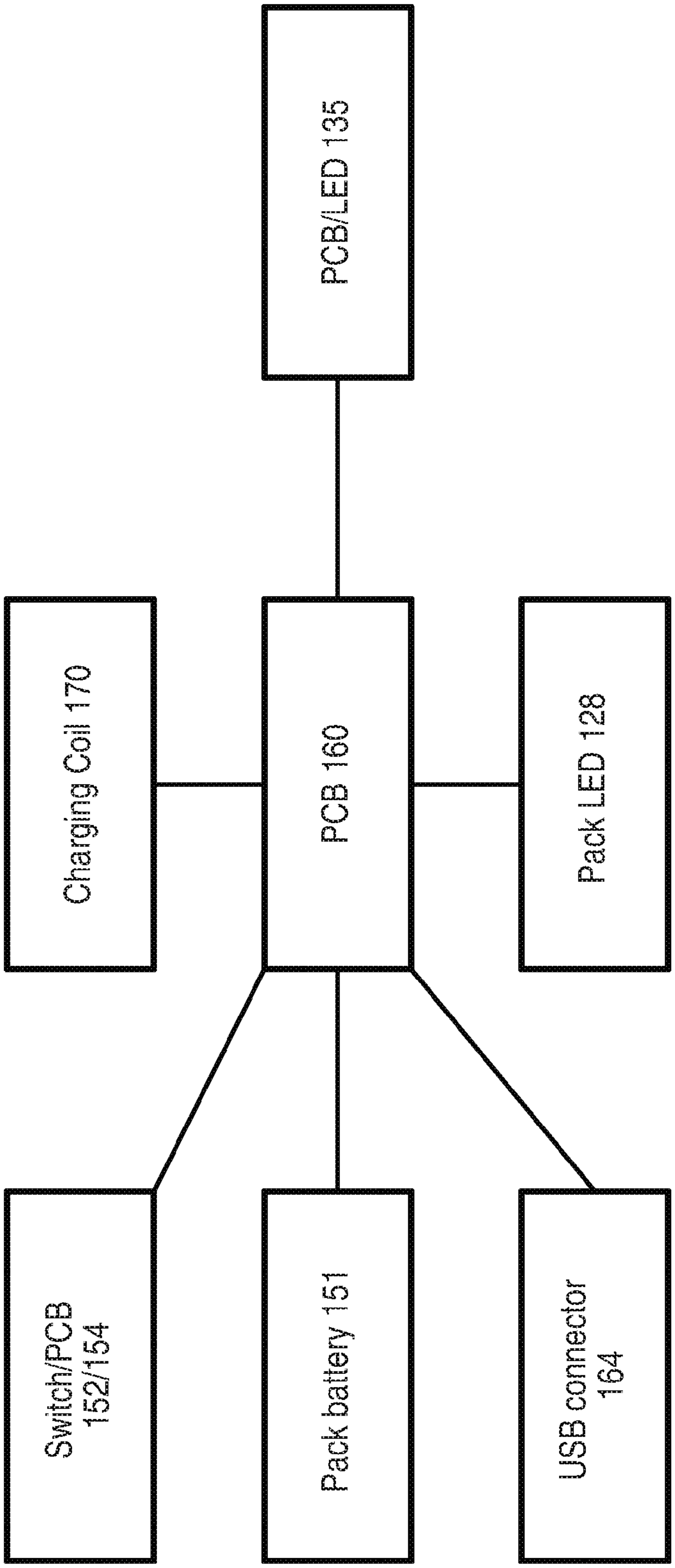
FIG. 8 is a schematic diagram of the electrical/electronic configuration of the pack of FIG. 2 in accordance with some embodiments of the disclosure.

FIG. 8 is a schematic diagram of the electrical/electronic configuration of the pack 100. Note that this diagram is primarily concerned with control operation rather than power supply (so, for example, a direct power supply linkage from pack battery 151 to switch/PCB 152/154 is omitted). FIG. 8 also assumes that the control functionality for the pack 100 resides on the main PCB 160, although some elements of this control functionality may be distributed or off-loaded as appropriate to PCB 154 or PCB 135.

The primary control inputs to the PCB 160, in accordance with some embodiments of the disclosure, are as follows:

a) external power supply available through USB connector 164 (yes/no). (There may also be additional control information provided by the USB connector, for example, to reset any usage data maintained within PCB 160, but these are not relevant for present purposes.)

b) level of charge in pack battery 151. The PCB 160 then uses the LED lights (within light cover 128) to provide the user with an indication of this charge level.

c) pack lid 140 open or shut according to switch 152.

d) presence of an e-cigarette in tube 132A (yes/no).

(It will be appreciated that this set of control inputs is provided by way of example only, and other embodiments may not have all the above control inputs and/or may have additional control inputs.) With regard to (d), the presence or absence of an e-cigarette can only change when the lid 140 is open, as detected by switch 152 (otherwise an e-cigarette cannot be inserted into or removed from the tube 132A). There are various ways in which such a change can be determined. For example, inserting an e-cigarette will change the effective inductance of the charging coil 170, by virtue of the mutual inductance arising from the corresponding induction charging coil in the e-cigarette, and this change in effective inductance can be detected by the PCB 160 or other sensor. Alternatively, if the pack 100 uses a wired connection for re-charging, then the resistance across and/or current through the wired connection will change upon contact with an e-cigarette. A further possibility is to use some other sensing or communication mechanism, e.g. mechanical, electrical, or optical, to determine the presence or absence of an e-cigarette in tube 132A. For example, the PCB 135 may capture light from LED 135 which is reflected back towards PCB 135, and the amount of such reflected light will vary according to whether or not an e-cigarette is present in tube 135. As another example, the bottom of tube 132A may include a mechanical switch, which is activated when an e-cigarette sits in the tube. The skilled person will be aware of further possible mechanisms for detecting the presence of an e-cigarette in the tube 132A.

The PCB 160 may also be provided with information concerning the level of charge of the battery within the e-cigarette 10. This information may just be a piece of binary information, namely whether or not the battery is fully charged. Alternatively, the PCB 160 may receive more granular information concerning the level of charge of the battery within the e-cigarette 10, such as an approximate percentage of the current charge level. As before, there are various ways in which the PCB 160 may be provided with this information (which may potentially different from how the PCB 160 determines the presence (or absence) of an e-cigarette in tube 132A). For example, as the e-cigarette battery becomes more charged, this may increase the effective loading on the charging circuit (wired or wireless), in that the charging has to overcome the opposing voltage of the battery which is being charged (which generally rises with an increasing level of charge). This increase in the effective loading on the charging circuit may be monitored to provide an indication of the charge level of the battery within the e-cigarette. Alternatively, for a wired connection between the pack 100 and the e-cigarette 10, the voltage level of the battery within the e-cigarette 10 may be applied to a particular contact, and hence is available for direct measurement by the pack 100. Another possible approach is for the e-cigarette 10 itself to monitor the voltage (and hence charge) level of its battery and then to communicate this information to the re-charging pack 100—for example, over some data or control line for a wired connection, or over some wireless communication link (e.g. Bluetooth) for wireless (such as induction) charging. As mentioned above, the annular light element 133 is used to provide an indication to the user of the charging state of an e-cigarette 10 inserted into the tube 132A. The charging state may indicate one or more of the following:

a) whether or not the pack 100 is currently charging the e-cigarette battery (through coil 170 in the embodiment of FIG. 3);

b) whether or not the e-cigarette battery is fully charged;

c) some indication of the level of charge of the e-cigarette 10 (intermediate between empty and full);

d) an error state or cut-off, e.g. because of an excess temperature has been detected in the pack 100 or the e-cigarette 10.

(It will be appreciated that this set of indications is provided by way of example only, and other embodiments may not provide all the above indications and/or may provide additional indications.)

Regarding (d), the pack 100 and/or the e-cigarette 10 may be provided with one or more suitable temperature sensors to make such a detection of over-heating, and such sensor(s) may supply a further control input to the PCB 160 to flag that the pack 100 or e-cigarette 10 is above a threshold temperature. The skilled person will be aware of various other error states that may arise (and be indicated to a user), for example, the detection of excess charging voltage or current, or a failure to determine whether or not an e-cigarette 10 is present in tube 132A, etc.

In accordance with some embodiments of the disclosure, the PCB 160 controls the PCB 135 and its associated light diode according to the charging conditions specified in Table 1 below. In particular, the CPU 160 detects transitions between the various states, based on the control inputs mentioned above, in order to detect the current state, and then sets the light operation as appropriate for (i.e. corresponding to) the current state.

TABLE 1

State of light signal according to charging state

| State | Light operation |
| --- | --- |
| No e-cigarette in pack | Off |
| Connected to external power supply (via USB 164) - e-cigarette charging | Pulsed (flashing) |
| Connected to external power supply (via USB 164) - e-cigarette fully charged | On |
| Not connected to external power supply - open lid - e-cigarette charging | Pulsed for 10 seconds - then fades out |
| Not connected to external power supply - open lid - e-cigarette fully charged | On for 10 seconds - then fades out |
| Not connected to external power supply - lid closed | Any existing lighting is faded out after a predetermined delay |

(Note that Table 1 only relates to functional states of the pack and e-cigarette—it does not include error states such as over-current; these can be indicated or flagged by similar modes of flashing lights, lights on and off, etc as for the functional states.)

The annular lighting element 133 (in combination with the PCB and LED 135) provides the user with an indication of the charging state of an e-cigarette in tube 132A. If no e-cigarette is present in tube 132A, the light (as provided by the PCB/LED 135 and annular lighting element) is off. However, if an e-cigarette is present, and the pack 100 is connected to an external power supply, such as via USB connector 164, then the light has one of two states: (i) flashing or pulsing (intermittently on), to indicate that the battery in the e-cigarette 10 is being charged; and (ii) continuously on to indicate that the battery in the e-cigarette 10 is fully charged.

If an e-cigarette 10 is present, but the pack 100 is not connected to an external power supply, then the behavior is modified in view of the limited power available within the pack battery 151. If the lid 140 is open, then the light is again flashed or pulsed to indicate that the battery in the e-cigarette 10 is partly charged, or is permanently on to indicate that the battery in the e-cigarette 10 is fully charged. However, this illumination of the light (either intermittent or continuous) is only for a first predetermined time period, say 10 seconds, after which the light fades out. This period is long enough to provide a clear indication of the charging status to the user, but not long enough to drain significant power from the pack battery 151. If the lid 140 is closed while the light is illuminated (again either intermittently or continuously), the light fades out after a predetermined delay and then over a predetermined time period, for example, 2 seconds. The predetermined delay may, for example, by 5 seconds, or some other value in the range 1-15 seconds (for example). A further possibility is that the predetermined delay is zero, so that the fading over the predetermined time period starts as soon as the lid 140 is closed.

As an example, if the pack 100 is connected to the mains supply (with the lid 140 already closed), the light is illuminated to indicate the charge state of the e-cigarette 10 in tube 132A. If the pack 100 is now disconnected from the mains supply, this light signal is faded out after the predetermined delay.

Although not explicitly indicated in Table 1, if the pack is not connected to an external power supply, the battery 151 of the pack 100 may be too depleted to re-charge a partly depleted e-cigarette battery. In this case, the light may still be illuminated intermittently to indicate the partly charged status of the e-cigarette 10 (even though there is no active re-charging in progress). However, if the e-cigarette u10 is fully charged, this can be indicated by having the light continuously on, subject to the fading specified in Table 1 according to whether the lid 140 is open or shut. Of course, if the battery 151 of the pack becomes fully depleted and there is no connection to an external power supply, then the light provided by PCB 135 will necessarily be off (because there is nothing to power it). Such a situation, namely the depletion of the pack battery, will be apparent to a user because the pack indicator LEDs (within light cover 128) will likewise be out (off) as well.

The above scheme of indications allows a user to rapidly determine the current charging state—especially whether the e-cigarette is currently being charged or is now fully charged. For example, if the pack 100 is disconnected from the mains and the lid 140 is closed, the lighting element 133 will be off. When a user opens the pack 100 to access an e-cigarette, the lighting element 133 will be illuminated for the predetermined period of time to allow a user to discern the current charge state of an e-cigarette 10 in tube 132A.

Figure 9:
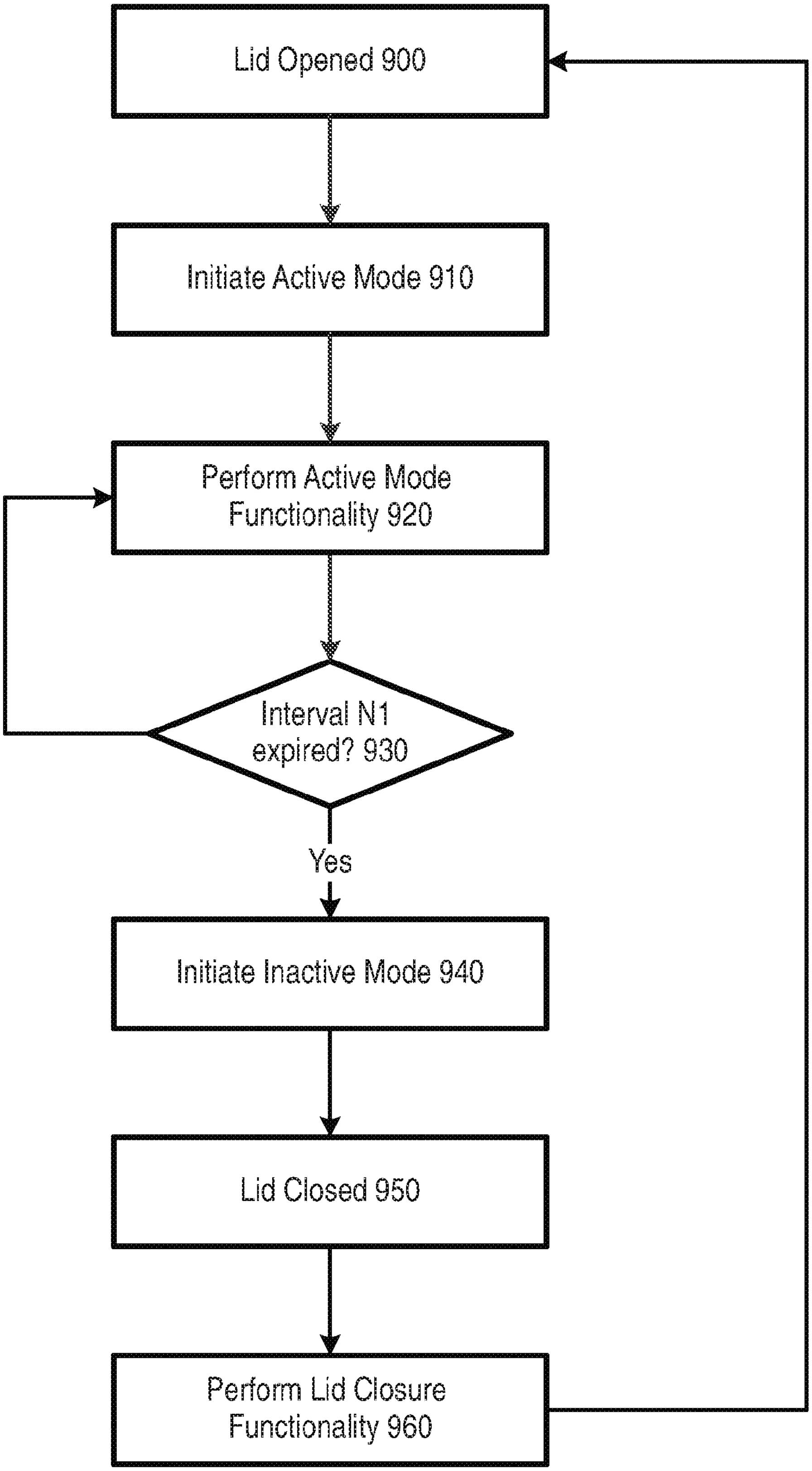
FIG. 9 presents a flowchart showing various operations of the pack in accordance with some embodiments of the disclosure.

FIG. 9 presents a flowchart showing various operations of the pack 100 in accordance with some embodiments of the disclosure. These operations may be generally managed by a control facility on the main PCB 160 (such as a micro-controller or processor). The starting point for the processing of FIG. 9 is assumed to be that the pack 100 is closed. It is now detected that the lid 140 is opened (operation 900) by virtue of the switch 152 and PCB 154 as described above. This detection causes the control facility to initiate an active mode (operation 910) during which various functionality associated with the active mode is performed (operation 920). Some of the functionality which is (or may be) associated with the active mode is described in more detail below. The initiation of the active mode at operation 910 also starts a timer, such as may be provided on the main PCB 160. The system performs the functionality associated with the active mode until this timer expires (operation 930), which is assumed to occur after a time interval of N1.

The expiry of the timer causes the pack 100 to enter an inactive mode (operation 940). As part of this inactive mode, the functionality associated with the active mode is generally terminated or performed at a reduced level. This inactive mode is then maintained until the lid 140 is closed (operation 950), which may be detected again by virtue of the switch 152 and PCB 154 as described above. This causes the pack to perform some functionality associated with the lid closure (operation 960) before returning to the beginning of the processing shown in FIG. 9, namely waiting for the lid 140 to open.

The processing of FIG. 9 helps to conserve power in the battery 151 of the pack 100, in that the active mode terminates after a predetermined time, and the inactive mode is commenced. Although some of the functionality of the active mode may be continued into the inactive mode (potentially at a reduced level), the overall amount of functionality which is performed in the inactive mode is lower than the functionality performed in the active mode. The power consumption in the inactive mode is therefore correspondingly lower than in the active mode.

The timer interval N1 representing the duration of the active mode may be varied according to the particular circumstances. For example, if the battery 151 of the pack 100 is fully charged (or mostly charged), the timer interval N1 may be set to a greater value than when the pack battery 151 has a lower level of charging. In other words, having a lower charge on the battery 151 will result in a shorter active period N1, thereby helping to conserve the (relatively small) remaining amount of battery charge. Another possibility is that if the pack 100 is actively connected to an external power supply (mains/USB), then the active mode may be maintained indefinitely, i.e. N1 is effectively set to infinity. This is because in such a situation there is no need to conserve charge on the battery 151 (because the active mode is being powered by the external power supply, and the battery 151 itself is being re-charged).

There are various pieces of functionality that may be performed as part of the active mode. For example, as described above (see Table 1), the light 133 around opening 132 may be illuminated for a predetermined period (say 10 seconds) after the lid opens to indicate a charging status of an e-cigarette 10 located within opening 132. After this predetermined period, which corresponds to the timer interval N1, the light 133 is faded—i.e. this functionality, which is part of the active mode, is terminated.

Another piece of functionality that may be performed as part of the active mode is the illumination of the indicator LEDs (within light cover 128). Thus as noted above, these LEDs provide a user with an indication of the charging status of the battery 151 within the pack 100. The LEDs are generally off when the pack lid 140 is closed but are illuminated, as part of the active mode functionality, when the lid is opened at operation 900. As shown in FIG. 2, the pack 100 is provided with multiple LEDs, and the current level of charge of the battery 151 may be indicated by illuminating a corresponding number (proportion) of these LEDs—e.g. having a greater charge in the battery 151 leads to an increased number of LEDs being illuminated. However, after the predetermined period N1 has expired, these LEDs are then faded out, as part of the transition to an inactive mode, in order to conserve battery power.

A further piece of functionality that may be performed as part of the active mode is to detect the presence of an e-cigarette in tube 132A. As noted above, there are various ways in which such a detection can be performed. For example, inserting an e-cigarette 10 will change the effective inductance of the charging coil 170, by virtue of the mutual inductance arising from the corresponding induction charging coil in the e-cigarette 10, and this change in effective inductance can be detected by the PCB 160 or other sensor. Alternatively, if the pack 100 uses a wired connection for re-charging, then the resistance across and/or current through the wired connection will change upon contact with an e-cigarette 10, similarly for any capacitance. A further possibility is to use some other sensing or communication mechanism, e.g. mechanical, electrical, or optical, to determine the presence or absence of an e-cigarette 10 in tube 132A.

This detection function (however implemented) may be operational in active mode, but may be discontinued in inactive mode. In other words, if there is no e-cigarette 10 in tube 132A when the lid 140 is open, then the functionality to detect the insert of an e-cigarette into tube 132 may be active for a period of time N1. After this time interval N1 has expired, the detection functionality may be switched off (become inactive). Accordingly, if an e-cigarette is inserted into tube 132A after the time interval N1, this may not be detected by the control facility. Consequently, the control facility may not start charging the e-cigarette 10 from the battery pack 151 and/or may not illuminate the light 133 to indicate the charging status of the e-cigarette (as described above).

In some cases the detection functionality may be operational in the inactive mode, but in a reduced manner. For example, during active mode the detection functionality may make a repeated check to determine the presence of an e-cigarette in tube 132A, for example at a time interval N2 (where N2 is typically >>N1). On the other hand, during inactive mode the detection functionality may make a repeated check to determine the presence of an e-cigarette in tube 132A at a time interval N3 (where N3>N2).

The processing may be somewhat different if an e-cigarette is initially present in the tube 132A when the pack 100 is opened, in which case the detection functionality aims to determine when the e-cigarette has been removed from tube 132A. If the e-cigarette is being charged from the battery pack 151 while it is in tube 132A, it may be desirable for the detection functionality to remain operational during this period, so it can switch off the charging facility upon removal of the e-cigarette 10. Accordingly, the pack 100 may remain in active mode while the charging is still in progress or alternatively the detection functionality may continue to be operational when the pack 100 goes into inactive mode (when the e-cigarette 10 is initially present at operation 900). It will be appreciated that in any case, the amount of power taken to remain in active mode or to maintain the detection facility in operation will normally be lower than the power taken to recharge an e-cigarette 10 in tube 132A.

If the pack 100 does not contain an e-cigarette on lid opening (at operation 900), and then goes into inactive mode without an e-cigarette 10 being inserted, then an insertion occurring after the expiry of the interval N1 may be detected at operation 960, as part of the functionality performed on lid closure. This is an appropriate timing for performing such a detection, since the pack closure represents a positive (and perhaps conclusory) action by the user, which may be linked to some other action (such as inserting an e-cigarette 10 into the pack). In addition, it will be appreciated that an e-cigarette cannot be inserted into the pack 100 once the lid 140 has been closed, so that trying to detect an inserted e-cigarette 10 at this stage represents a final, one-off check. If an e-cigarette 10 is detected at this stage (as part of the functionality of operation 960), then this may trigger one or more additional actions of the control facility, for example, initiating charging of the e-cigarette 10 from the pack battery 151 if appropriate. On the other hand, if it is confirmed that no e-cigarette is present at this stage, then tube 132A will remain empty at least until the lid is opened, which returns to operation 900 (and the subsequent processing as described above).

FIG. 9 shows the lid being closed (operation 950) after the time interval N1 has elapsed (at operation 930) since the lid 140 was opened (operation 900)—thereby including the transition from active mode to inactive mode. However, a user may of course sometimes close the lid before the expiry of the time interval N1. In these circumstances the pack 100 does not transition from active mode to inactive mode, but rather would go straight, in effect, from operation 920 to operation 950 in FIG. 9. In this case, some or all of the lid closure functionality of operation 960 may be unnecessary, because there was no time spent in the inactive mode to cover for. On the other hand, the lid closure functionality of operation 960 may still be performed, even if potentially redundant, by way of a safeguard or double-check (such as to whether the pack now contains an e-cigarette).

Although in the particular example of Table 1 above, N1 equals 10 seconds, it will be appreciated that there are many other possibilities. For example, N1 may lie in the range of 2 second to 2 minutes, or the range of 4 seconds to 1 minute, or of 5 to 30 seconds, or of 5 to 20 seconds, or of 8 to 15 seconds. In addition, in some implementations the value of N1 may vary according to the particular piece of functionality. Thus one piece of functionality may be active for a first value of N1 (say N1*a*), while another piece of functionality may be active for a second, different value of N1 (say N1*b*, where N1*b* does not equal N1*a*). In this case the transition from active mode to inactive mode is staggered for the different pieces of functionality. This may be helpful if some of the functionality in active mode consumes more power and/or is less important than other functionality (whereby it may be desirable to retain the latter functionality in an active state for longer than the former functionality). Also, the transition from active mode to inactive mode does not have to be sharp, but may be gradual—for example, as per the gradual fading of light 133 after the lid 140 has been open for 10 seconds, as described above.

As described herein, a pack is provided for holding and re-charging an e-cigarette. Such an e-cigarette may comprise an electronic vapor provision system (the vapor may or may not be nicotine), an electronic nicotine delivery system, etc. The pack includes a pack battery and a body portion including a tube for receiving an e-cigarette. The pack further includes a re-charging mechanism for re-charging the e-cigarette received into the tube using the pack battery (which is typically significantly larger than any battery included in the e-cigarette). The re-charging mechanism may utilize a wired or wireless connection to the e-cigarette. The pack further includes a lid attached to the body portion. The lid can be opened to allow the e-cigarette to be received into the tube, and closed to retain the e-cigarette in the tube. The pack is configured to transition from a higher power state to a lower power state a predetermined period of time after the lid is opened (and while the lid is still open). The lower power state draws less power from the pack battery than the higher power state, and thereby helps to conserve charge in the pack battery.

On the other hand, in some cases, if the pack is connected to an external power source (such as a USB connector or the mains), the transition from a higher power state to a lower power state may not occur. This is because it is generally not necessary to conserve battery power in such circumstances (since the pack battery itself is being recharged).

The pack may include a switch (electrical or mechanical) which is activated by the lid opening and closing. The predetermined period of time commences when the switch is activated by the lid opening and the transition to a lower power state occurs after the predetermined time period has expired, assuming that the lid remains open.

The pack may include lights for indicating the charge status of the pack battery and/or the e-cigarette. These lights may be illuminated when the lid is opened, but are then switched off after the predetermined period as part of the transition from a higher power state to a lower power state to conserve power.

The pack may include a detection mechanism which detects whether an e-cigarette is located in the tube. The detection mechanism may operate when the lid is opened, and then stop operating as part of the transition from a higher power state to a lower power state if an e-cigarette has not been inserted into the tube during the predetermined time period. In other words, if an e-cigarette is inserted into the tube, this will be detected by the pack if the predetermined time period has not yet expired and the pack may then start re-charging the e-cigarette (if a second trigger is also activated, see below). However, the insertion of the e-cigarette will not be detected by the pack if the predetermined time period has now expired, and hence no re-charging will be performed (at least while the lid remains open, or absent some other trigger, see below).

In some embodiments, the mechanism for detecting whether an e-cigarette has been inserted into the tube may be re-activated when the lid is closed. This will generally be a short (temporary) re-activation to make a final check on whether an e-cigarette is located in the tube in the pack. If such a detection is positive, the pack may initiate some further processing, such as beginning to re-charge the e-cigarette from the pack battery. On the other hand, some other functionality might not be utilized—e.g. lights to indicate a charging status of the e-cigarette might not now be illuminated, since the closed lid of the pack may indicate that the pack is being put away, e.g. into a bag.

Using a detection of the closure of the lid to trigger or activate a detection of whether an e-cigarette 10 is located in tube 132A can be considered as a dual activation mechanism, in that re-charging of the e-cigarette 10 is triggered by two input mechanisms, namely (i) insertion of an e-cigarette, and (ii) closing the lid. There are various reasons why such a dual activation mechanism may be beneficial. For example, the mechanism for detecting the insertion of an e-cigarette may require some power from the pack battery 151. However, if there is another activation mechanism, such as the mechanical switch 152 for detecting closure of the lid, then this can be used to trigger the mechanism for detecting the insertion of the e-cigarette. This helps to conserve power within the pack 100.

In addition, the mechanism for detecting the insertion of an e-cigarette may possibly trigger on the accidental insertion of some other object (a foreign body) into tube 132A. Such a foreign body may be sufficient to trigger a detection of a (supposed) e-cigarette in tube 132A. For example, if the detection is based upon the occlusion or reflection of a light beam passing across a diameter of tube 132A, then the foreign body may provide such occlusion or reflection; similarly, if the pack 132A implements a wired connection to e-cigarette 10 and the detection is based upon a change in resistance or capacitance between wired connectors at the base of tube 132A, this might again be triggered by the foreign body. It will be appreciated that providing a recharging current to this foreign body might potentially result in overheating and consequential damage to the pack 100. However, this risk can be reduced if a second activation mechanism is required to trigger the re-charging current, since the re-charging then does not occur immediately the foreign body enters the tube, but rather only when the user triggers the second activation mechanism. This therefore provides the user with an additional opportunity to remove the foreign body from tube 132A before the pack 100 begins re-charging.

A further reason for having an additional activation mechanism is if the user wants to use the pack to store the e-cigarette, but does not want to re-charge e-cigarette. Such a situation may arise, for example, if the user does not intend to use the e-cigarette in the near future.

In general, for a pack having a dual activation mechanism for re-charging, one of the activation mechanisms is based on the insertion of an e-cigarette into the tube 132A (since no re-charging is possible if the e-cigarette 10 is not in the tube 132A). A variety of mechanisms can provide the second activation mechanism. For example, one possibility is that the second activation mechanism is based on closing lid 140, which is detected and indicated by switch 152, as discussed above. Another possibility is to use connection of the pack 100 to an external power source as the second activation mechanism. A further possibility is to provide a specific re-charging switch on the exterior of pack 100, whereby a user presses or otherwise operates this switch to provide the second activation mechanism. The switch could take any appropriate form, such as a mechanical switch which is moved between two positions (in/out or up/down, for example), some form of rotary switch, a touch sensitive switch, and so on.

The details of the activation may vary from one switch to another. For example, the activation might be a touch-sensitive pad, and the activation trigger is only present as long as the user contacts the touch-sensitive pad. Such a configuration might also be implemented by a switch that has a rest (off) position, where a user can push (or slide, or rotate etc) the switch to an activation position, but the switch is resiliently biased to return to the off/rest position once released by the user. This type of switch (or other activation mechanism) is referred to herein as a monostable trigger, since the default (rest) state of no activation will apply unless the user is currently activating the trigger mechanism. Note that having an electrical connection from the pack to an external power source can also be regarded as such a monostable trigger—i.e. the pack remains in the state of activation for as long as the electrical connection is present and supplying power.

In some cases, a monostable switch may remain in the activated state for a predetermined period of time, which is typically measured either from the initial activation, or from when the specific user action has terminated. For example, pressing a touch-pad may cause the trigger to remain activated for a predetermined period of say 10 seconds, irrespective of the duration of the user contact. After the predetermined period has expired, the activation ceases.

Another type of switch (or other form of trigger) is referred to herein as a toggle or bistable trigger. In this type of trigger, the user performs a first action to place the device in the activated state, and the device remains in the activated state (without requiring further action by the user) until a second action is performed. Note that the second action may be regarded as the inverse of the first action. An example of a toggle trigger is a switch with two (stable) positions, one corresponding to off (not activated), and one corresponding to on (activated). The user then moves the switch to the activated or not activated position as desired. Another example of a toggle trigger would be a touch-pad, whereby a first touch places the device into an activated state. The device then remains in the activated state (irrespective of the duration of the touch) until there is a separate second touch to remove the device from the activated state.

Further examples of toggle triggers would be the insertion and then removal of an e-cigarette into/from tube 132A, or closing and opening lid 140, in both cases to activate and then de-activate respectively. Alternatively, insertion of an e-cigarette into tube 132A and closing the lid 140 might both be monostable triggers, in which the trigger remains active for a predetermined period (e.g. several seconds) after the initial trigger action.

The ability to have different types of trigger allows various possibilities in the overall configuration of the dual activation mechanism. For example, if the first trigger is insertion of the e-cigarette into tube 132A, this may represent a toggle activation to leave the first trigger in the activated state. A user might then be expected to perform a second (monostable) trigger subsequent to this first trigger to complete the dual activation, and hence start charging—for example, by closing the pack lid or by pressing a button.

This dual activation sequence might be helpful in that if a user accidentally drops a foreign body into tube 132A, then the re-charging does not start unless some further positive action (the second trigger) is performed.

Note that in some cases, there may be a delay between the user trigger action, such as inserting an e-cigarette into tube 132A, and the system detecting that such an action has been performed—e.g. if the detection is involves some regular polling action which is only performed at predetermined intervals. In this case, the user action to insert the e-cigarette can be regarded as the trigger activation, although the activation would not become effective until the insertion has been detected by the device.

It is also possible for detection of the first trigger action to be activated or initiated by the second trigger action (or vice versa). Thus in the example mentioned above, where the first trigger is insertion of the e-cigarette into tube 132A, and the second (monostable) trigger is closing the pack lid or pressing a button, the second trigger may cause the device to check for (detect) the presence of the inserted cigarette (if this has not already been detected). This approach may help to reduce power if detecting the insertion of an e-cigarette itself consumes battery power, since the detection does not have to be performed unless the second trigger is activated.

This arrangement of having the lid closure (or second other activation mechanism) initiate a detection of the presence (or absence) of an e-cigarette in the pack (which represents the first trigger mechanism) is also beneficial in that the state of activation of the first trigger mechanism is then detected with the most appropriate timing. For example, consider a pack which is initially closed, and then the pack lid is opened and subsequently closed. While the pack lid is opened, the device does not have to detect whether an e-cigarette has been inserted into tube 132A, or conversely, whether a previously present e-cigarette has now been removed from tube 132A—rather such detection may be deferred until the second trigger (lid closure) is activated.

The implementation of the dual activation mechanism may be dependent the primary concern that is being addressed. For example, if a primary concern is to conserve power in relation to the mechanism for detecting insertion of an e-cigarette, then this does not apply if the pack is currently connected to an external power source. Accordingly, when the pack is connected to such an external power source, then re-charging may be initiated directly upon detection that an e-cigarette has been inserted into the pack 100, since the external power source can provide the power to detect whether an e-cigarette has been inserted into the pack 100. In these circumstances, the connection to the external power source can be regarded as the second trigger, which is active for as long as this electrical connection is present. However, if the primary concern is to avoid accidental charging of foreign objects in the pack, the it may be decided that connection to an external power source should not represent an activation mechanism.

Note that even if having an external power source does represent an activation mechanism, this does not imply that such an external power source is always necessary to trigger re-charging of the e-cigarette. For example, if the pack is not connected to an external power source, then a second (different) trigger, such as operation of a switch, may be accepted by the dual activation mechanism to begin re-charging. Accordingly, the dual activation mechanism may potentially support multiple (more than two) triggers, and activate in response to predetermined combinations of two triggers being received—e.g. if an e-cigarette is present and an external power connection is provided, or if an e-cigarette is present, and a switch is pressed. However, the dual activation mechanism may be configured such that having external power and a switch being pressed cannot be used (in combination with one another) as the first and second triggers for the dual activation mechanism.

Note that there may also be other conditions on the supply of power from the pack to the e-cigarette for re-charging. For example, this supply of power from the pack to the e-cigarette may require the pack battery itself to have more than a certain level of charge, or require the temperature of the pack battery to be within acceptable limits. However, these conditions are not considered an activation mechanism per se, since an activation mechanism can be triggered directly by some user action (such as moving a switch), whereas there is no such direct triggering associated with these conditions.

The approach described herein provides a pack for holding and re-charging an e-cigarette. The pack comprises a pack battery; a body portion including a tube for receiving an e-cigarette; a re-charging mechanism for re-charging the e-cigarette received into said tube using the pack battery; and a dual activation mechanism. The e-cigarette can be re-charged in the tube without disassembly of the e-cigarette, thereby increasing convenience for a user. The dual activation mechanism comprises two separate triggers for causing the re-charging mechanism to begin re-charging the e-cigarette received into the tube using the pack battery. The re-charging begins only in response to the direct activation by a user of both of these two separate triggers.

There are various potential benefits to having the dual activation mechanism. For example, it may provide protection against the situation that a foreign body is accidentally inserted or dropped into the tube for re-charging. This can be particularly helpful for a pack where the e-cigarette in the tube will form a connection based on gravity (without further engagement of an electrical connection). It may also help to conserve the charge lifetime within the pack battery.

The direct activation by a user represents a specific action taken by the user which then acts as a trigger for the re-charging mechanism. One example of such a direct activation is for a user to insert an e-cigarette into the tube. This trigger is likely to be used in most implementations, given that an e-cigarette must be inserted into the tube in order for there to be an e-cigarette for the pack to recharge. The insertion of an e-cigarette into the tube (or the presence of an e-cigarette in the tube) may be determined by various mechanisms, for example, based on mechanical, optical and/or electrical detection.

There are a number of possible implementations for the second trigger. For example, in some implementations, the pack further comprises a lid, which when open allows access to the tube for receiving or removing an e-cigarette, and when closed holds the e-cigarette in the pack. The second trigger may comprise closing the lid. In order to support this trigger, the pack may be provided with a switch which is mechanically activated by closing the lid, so that the switch in effect provides the trigger.

Another possible implementation of the second trigger is as a user-activated switch on the exterior of the pack. This switch can be formed in any suitable manner. For example, the switch may be a mechanical unit which a user pushes, slides, rotates, or twists (etc) between an off and on position (whereby the on position provides the second trigger). Another possibility is that the switch is implemented as a touch-sensitive surface, so that touching the surface provides the second trigger.

In some cases, the second trigger might only be activated after the first one of the two separate triggers has detected that the e-cigarette has been received into said tube. This corresponds to a natural sequence for a user of first inserting the e-cigarette into the tube, and then starting (activating) re-charging by pushing a switch (for example). However, other implementations may use a different approach. For example, the second trigger might be opening (rather than closing) the lid 140, and this will naturally be performed prior to inserting the e-cigarette into the tube 132A. However, this ordering may provide less protection in the situation where a foreign body is accidentally dropped into the tube instead of the e-cigarette 10.

In some implementations, the re-charging of the e-cigarette is performed by induction re-charging of the e-cigarette. This re-charging mechanism avoids the need for any wired connection between the pack 100 and the e-cigarette 10. At one level, this simplifies the procedure for a user to initiate re-charging, but also potentially increases the risk associated with a foreign body being introduced into tube 132A. However, this risk may be mitigated, at least to some extent, by providing the dual activation mechanism described herein.

In some other implementations, the pack includes a wired connector at the base of the tube. The first one of the two separate triggers detects when the wired connector makes electrical contact with a corresponding connector at one end of the e-cigarette received into the tube. This wired connection may be formed, at least in some implementations, using only gravity and the weight of the e-cigarette (in other implementations, this gravitational force may be supplemented by downward pressure on the e-cigarette from a closed lid). Again, such an arrangement simplifies the procedure for a user to initiate re-charging, since the user only has to insert the e-cigarette into the tube, but does not have to further manipulate the e-cigarette to form an electrical connection, such as by screwing the connector on the pack together with the connector on the e-cigarette. This arrangement is therefore very convenient for a user, although it does potentially increase the risk associated with a foreign body being introduced into tube 132A. However, this risk may be mitigated, at least to some extent, by providing the dual activation mechanism described herein.

The pack may be provided with one or more lights 133 for indicating whether the re-charging of the e-cigarette has been activated. Such lights, and/or some other indication mechanism (e.g. sound), provide useful feedback to the user that the charging is indeed occurring, thereby confirming to the user that the appropriate actions have been completed to trigger the dual activation mechanism. For example, as noted in Table 1 above, the light 133 may be off when re-charging is not being performed, pulsed when re-charging is active, and then on (without pulsing) to indicate that the pack batter is now fully charged. (The lighting indication may only be provided for a limited period of time in order to conserve battery power if the pack is not connected to an external power source).

In conclusion, this disclosure shows by way of illustration various embodiments in which that which is claimed may be practiced. The advantages and features of the disclosure are of a representative sample of embodiments only, and are not exhaustive and/or exclusive. They are presented only to assist in understanding and to teach that which is claimed. It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc other than those specifically described herein. The disclosure may include other inventions not presently claimed, but which may be claimed in future.

The invention claimed is:

1. A pack for holding and re-charging an e-cigarette, the pack comprising:
- a pack battery;
- an opening for receiving an e-cigarette inserted by a user into the pack;
- a re-charging mechanism for re-charging the e-cigarette received into the pack using the pack battery; and
- a user-activated switch or button on an exterior of the pack for causing the re-charging mechanism to begin re-charging the e-cigarette which has been inserted into the pack using the pack battery,
- and wherein the pack is provided with one or more temperature sensors to detect an excess temperature in the pack.

2. The pack of claim 1, wherein the re-charging of the e-cigarette is performed by induction re-charging of the e-cigarette.

3. The pack of claim 1, further comprising a wired connector for making electrical contact with a corresponding connector at one end of the e-cigarette received into the opening.

4. The pack of claim 3, further comprising a tube which has the opening at one end for inserting the e-cigarette for re-charging and a base end including electrical contacts for re-charging the e-cigarette within the tube.

5. The pack of claim 4, wherein the electrical contacts are configured to re-charge the e-cigarette via a tip end of the e-cigarette.

6. The pack of claim 5, wherein the pack further comprises a lid, wherein the lid when closed is configured to exert a pressure on the e-cigarette in a direction towards the base end of the tube, thereby helping to provide a more reliable electrical contact between the tip end of the e-cigarette and the electrical contacts at the base end of the tube.

7. The pack of claim 1, wherein the pack when open allows access for receiving or removing the e-cigarette, and when closed holds the e-cigarette in the pack.

8. The pack of claim 1, wherein the pack further comprises a lid and a switch, wherein the switch is mechanically activated by closing the lid.

9. The pack of claim 1, wherein the pack further comprises a light to indicate a charging status of the e-cigarette, the light being pulsed to indicate the e-cigarette is being recharged.

10. The pack of claim 1, wherein the pack further composes multiple light-emitting diodes (LEDs) to provide a user with an indication of a charging status of the pack battery, whereby having a greater charge in the pack battery leads to an increased number of the LEDs being illuminated.

11. The pack of claim 1, wherein the pack supports a wireless communications link.

12. The pack of claim 11, wherein the pack is configured to communicate with an e-cigarette over the wireless communications link.

13. A system comprising the pack of claim 1 and an e-cigarette inserted into the pack.

14. A method for operating a pack for holding and re-charging an e-cigarette, the pack comprising a pack battery, the method comprising:

receiving an e-cigarette inserted by a user into the pack; and re-charging thee-cigarette received into the pack using the pack battery;

wherein a user activates a switch or button on an exterior of the pack to begin re-charging the e-cigarette which has been inserted into the pack using the pack battery, and wherein the pack is provided with one or more temperature sensors to detect an excess temperature in the pack.

15. The method of claim 14, further comprising detecting that the e-cigarette has been inserted by a user into the pack prior to starting the re-charging of the e-cigarette.

* * * * *